US011816740B2

(12) United States Patent
Chmielewski et al.

(10) Patent No.: US 11,816,740 B2
(45) Date of Patent: *Nov. 14, 2023

(54) SYSTEMS FOR GENERATION OF LIABILITY PROTECTION POLICIES

(71) Applicant: AON RISK SERVICES, INC. OF MARYLAND, New York, NY (US)

(72) Inventors: Nicholas Joseph Chmielewski, Chicago, IL (US); Derek Charles Lietz, Boston, MA (US); Lewis C. Lee, Seattle, WA (US); Daniel Crouse, Seattle, WA (US)

(73) Assignee: AON RISK SERVICES, INC. OF MARYLAND, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,902

(22) Filed: Nov. 28, 2022

(65) Prior Publication Data

US 2023/0169600 A1 Jun. 1, 2023

Related U.S. Application Data

(63) Continuation of application No. 16/542,799, filed on Aug. 16, 2019, now Pat. No. 11,514,529.

(60) Provisional application No. 62/855,550, filed on May 31, 2019.

(51) Int. Cl.
*G06Q 50/18* (2012.01)
*G06Q 40/08* (2012.01)

(52) U.S. Cl.
CPC .......... *G06Q 40/08* (2013.01); *G06Q 50/184* (2013.01)

(58) Field of Classification Search
None
See application file for complete search history.

(56) References Cited

U.S. PATENT DOCUMENTS

| 6,330,547 | B1 | 12/2001 | Martin |
| 8,355,932 | B2 | 1/2013 | Malackowski et al. |
| 8,515,783 | B1 * | 8/2013 | Weeks ............... G06Q 10/0635 705/4 |
| 11,188,985 | B1 * | 11/2021 | Lietz .................... G06Q 50/184 |

(Continued)

OTHER PUBLICATIONS

Office Action for U.S. Appl. No. 16/542,799, dated Feb. 17, 2021, Chmielewski, "Systems for Generation of Liability Protection Policies ", 11 Pages.

(Continued)

*Primary Examiner* — Bruce I Ebersman
*Assistant Examiner* — Matthew Cobb
(74) *Attorney, Agent, or Firm* — Lee & Hayes, P.C.

(57) ABSTRACT

Systems and methods for intellectual property (IP) asset protection are disclosed. For example, by analyzing characteristic information associated with a user, along with feedback from one or more potential insurers, the system may determine various terms of an insurance policy for protecting the user against claims of IP infringement. The policy may provide for financial reimbursement for costs incurred while taking active measures to mitigate losses and/or defend against such claims. In addition, the system may analyze the characteristic information to identify various users having a low exposure of an infringement claim being asserted. The identified users may be actively targeted to acquire an IP protection policy.

19 Claims, 6 Drawing Sheets

500

Determine, based at least on characteristic data associated with an entity, an infringement exposure value associated with the entity, the characteristic data associated with at least one of business information, intellectual property information, or legal claim information
502

Determine at least one term of an insurance policy associated with the entity, the insurance policy including at least the cost
504

(56) References Cited

U.S. PATENT DOCUMENTS

| | | | |
|---|---|---|---|
| 2002/0077870 A1* | 6/2002 | Wilkinson | G06Q 40/08 |
| | | | 705/4 |
| 2003/0036945 A1 | 2/2003 | Del Vecchio et al. | |
| 2010/0114634 A1* | 5/2010 | Christiansen | G06Q 30/018 |
| | | | 705/317 |
| 2010/0169127 A1* | 7/2010 | Malackowski | G06Q 50/184 |
| | | | 705/306 |
| 2016/0321582 A1 | 11/2016 | Broudou | |
| 2016/0350886 A1* | 12/2016 | Jessen | G06Q 50/184 |
| 2018/0330456 A1* | 11/2018 | Odutola | G06Q 50/184 |
| 2020/0380606 A1 | 12/2020 | Chmielewski et al. | |

OTHER PUBLICATIONS

Office Action for U.S. Appl. No. 16/887,603, dated Mar. 29, 2022, Chmielewski, "Systems for Generation of Liability Protection Policies", 27 Pages.

Office Action for U.S. Appl. No. 16/542,799, dated Aug. 3, 2021, Chmielewski, "Systems for Generation of Liability Protection Policies", 19 Pages.

Office Action for U.S. Appl. No. 16/542,799, dated Oct. 1, 2020, Chmielewski, "Systems for Generation of Liability Protection Policies", 7 Pages.

Office Action for U.S. Appl. No. 16/887,603, dated Oct. 14, 2022, Chmielewski, "Systems for Generation of Liability Protection Policies", 39 pages.

Office Action for U.S. Appl. No. 16/542,799, dated Dec. 15, 2021, Chmielewski, "Systems for Generation of Liability Protection Policies", 20 Pages.

* cited by examiner

SYSTEMS FOR GENERATION OF LIABILITY PROTECTION POLICIES

RELATED APPLICATION

This application claims priority to and is a continuation of U.S. patent application Ser. No. 16/542,799, filed on Aug. 16, 2019, which will issue as U.S. Pat. No. 11,514,529 on Nov. 29, 2022, which claims the benefit of and priority to U.S. Provisional Patent Application Ser. No. 62/855,550, filed on May 31, 2019 and titled "Systems for Generation of Liability Protection Policies", all of which are herein incorporated by reference in their entirety.

BACKGROUND

Businesses often acquire insurance for a variety of protection purposes, such as claims of personal injury or employment-related issues. One exposure many businesses face is the burdensome costs that may accrue in the defense against, and resolution of, allegations of intellectual property (IP) infringement. However, unlike some other risks and forms of insurance protection, it may be difficult to assess the business's exposure to IP infringement allegations and/or the policy terms associated with an appropriate IP liability protection policy. Described herein are improvements in technology and solutions to technical problems that can be used to, among other things, formulate the terms and conditions of insurance policies geared towards intellectual property liabilities.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
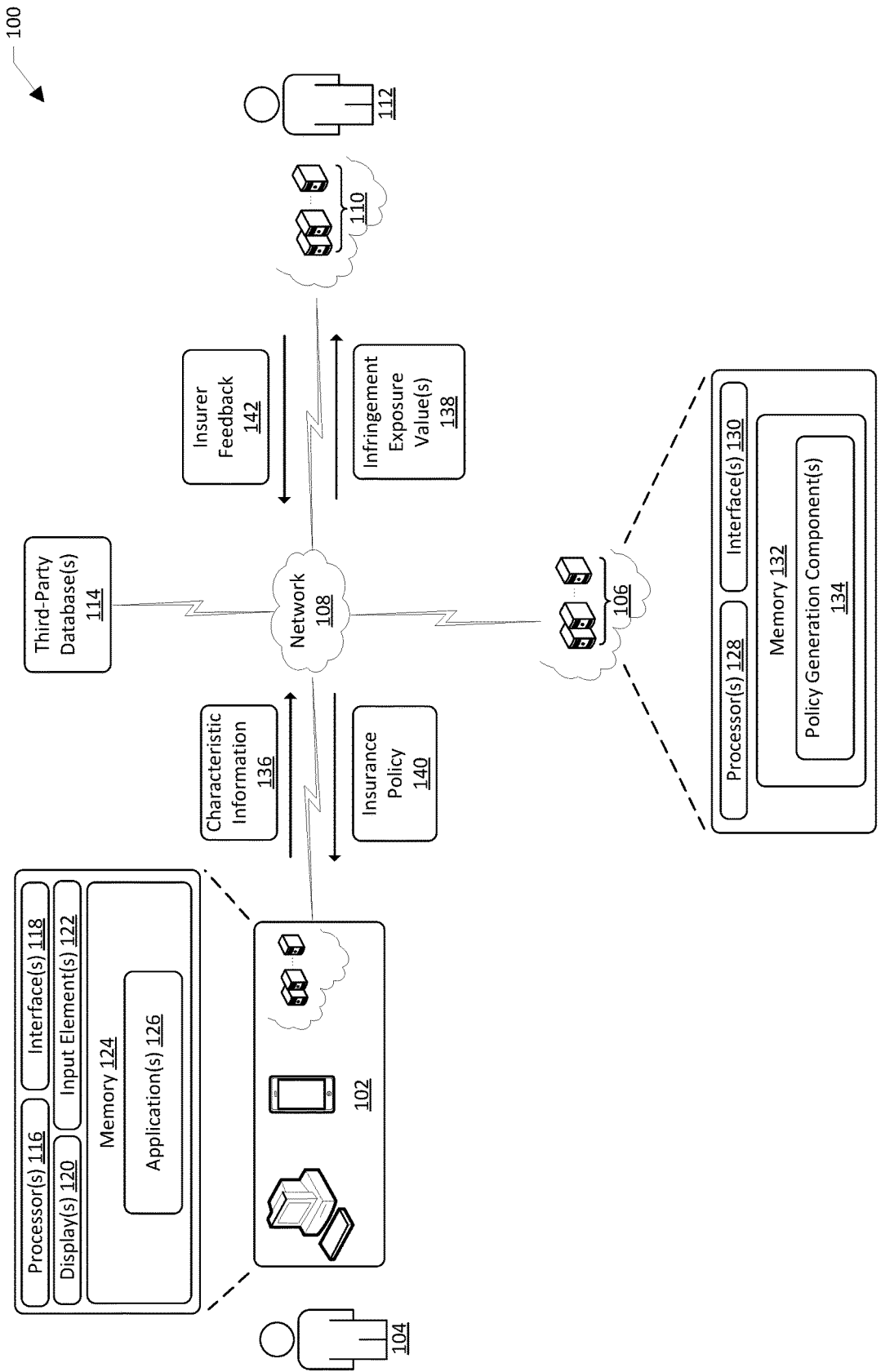
FIG. 1 illustrates a schematic diagram of an example environment for intellectual property (IP) liability protection.

Systems and methods for intellectual property (IP) risk protection are disclosed herein. In particular, the systems and methods described herein provide techniques for determining and/or generating the terms for an IP liability protection policy to compensate the policy owner for costs incurred in the defense and resolution of a claim for IP infringement. For example, a company offering one or more products and/or services may wish to obtain an insurance policy to protect against claims that the products or services infringe the intellectual property rights of some third party or parties. The system allows for user information associated with a user trying to obtain an IP liability policy (e.g., a business associated with the user) to be gathered and analyzed in order to determine various characteristic information. The characteristic information may include such information as a business classification, employee information, revenue information, litigation history, entity status, IP asset information, and the like, for example. This information may be utilized to determine one or more infringement exposure values associated with the user representing an exposure that the user will have a claim for IP infringement asserted against them. In addition, the system may solicit feedback from a potential insurer. The insurer feedback may be utilized to adjust the analysis that has been performed and/or to determine a cost associated with insuring the user. It should be understood that anytime the word "user" is used herein, that term includes individuals and/or entities and/or, in the context of sending information using computing devices, computing devices.

Unlike conventional protection policies acquired by users, such as policies covering claims related to injuries, employment issues, and the like, it may be difficult to evaluate the potential exposure associated with an IP liability protection policy. As such, conventional policies relating to IP liability often involve a costly and time-consuming evaluation process. In addition, conventional policy terms may not be based on data associated with the user, such as the characteristic data and infringement exposure values utilized by the system herein. As such, the pricing and/or other policy details associated with conventional IP liability policies may be difficult to obtain, poorly reflect the risks of a specific user, and lack stability.

The techniques for determining IP liability policy terms as described herein, however, help to formulate more accurate and efficient policy terms for providing protection related to IP risks. Additionally, the IP liability policy terms determined and/or generated may expand coverage. For example, terms may include coverage for loss mitigation techniques, such as design-around services aimed at mitigating future losses. Further, the terms may include coverage for contractual indemnities owed under existing contractual obligations (e.g., contractual obligations to existing customers). Still further, as a result of the improved techniques described herein, co-insurance terms may be decreased and the aggregate limit of the IP liability policy may be increased, thus resulting in extended coverage, along with both a lower financial obligation for the user based on a better understanding of potential payouts under the policy.

In some examples described below, the system may receive a request for insurance policy coverage from a user for claims relating to IP liability. The user may be, or may represent, a business producing one or more goods for sale and/or offering one or more services. In addition, the business may have one or more IP assets, such as patents, trademarks, and the like, for example. The user may wish to obtain a policy providing protection against costs and liability (e.g., financial liability and/or legal liability) resulting from legal claims and, in particular, IP infringement claims. For example, the user may seek a policy that provides reimbursement for defense of an infringement claim brought by a third-party. Defense of the claim may include legal fees, mitigation costs (e.g., design-around costs), settlements and damages, indemnification costs, and the like.

The user may submit a request, along with preliminary information, to the system that may be used to determine one or more terms of the policy and/or generate policy recommendations. The preliminary information may include information relating to one or more characteristics of the user such as business information, IP asset information, and/or a legal history. Alternatively, or in addition, upon receiving the request from the user, the system may request information from the user. Still further, in response to receiving the request, the system may access one or more local and/or third-party databases having information relating to the user such as characteristics of the user. For instance, the system may determine that the user has not provided certain information relating to the characteristics and may access one or more databases to gather the necessary information regarding the user.

In examples, in response to receiving the request, the system may provide a graphical user interface (GIU) to a device of the user and/or the user having one or more fields for receiving the request and/or requesting information associated with the characteristics. For instance, the system may be configured to receive the request along with preliminary information indicating a type of user (e.g., a business category of the user, a type of policy the user is seeking, etc.). Based on the preliminary information, the system may generate various GUI elements configured to receive and/or request input of information according to the type of user indicated (e.g., the information received and/or requested may be customized according to the type of user). The GUI may receive the input from the user and generate input data for use by the system. The GUI may generate input data that is encrypted or otherwise protected for transfer to the system. Further, the input data may indicate various indicators of the input data, such as a time the input data was received, an identifier of the user, and the like, for example.

In further examples, the system may analyze the user-provided information and/or the accessed information to generate characteristic data associated with the one or more characteristics of the user. For example, the user may provide business information, such as classification information, which the system may analyze to determine the standard industrial classification (SIC) code associated with the user's business. Additionally, the system may analyze the received/accessed information to determine and/or generate characteristic data associated with the user's business including, but not limited to, an employee count, revenue size, litigation history, whether the company is publicly or privately held, IP assets, and the like, for example.

As described herein, the characteristic data may be utilized to determine an infringement exposure value associated with the user. For example, the characteristic data may be used by the system to determine an infringement exposure value indicating a predicted exposure that an infringement claim may be brought against the user. In particular, the infringement exposure value may indicate a predicted frequency and/or severity of potential infringement claims against the user (e.g., a number of claims that may be brought against the user annually and/or a predicted value of monetary liability), and/or an exposure (e.g., how exposed the user is to infringement claims based on the current policies, such as existing policies already in place to protect various products/services against claims of infringement, and/or IP assets in place). In some examples, one or more infringement exposure values may be determined. For example, the system may determine an infringement exposure value on the basis of each revenue source, such as a product, service, or any other revenue-producing offering (e.g., in association with each product/service owned, manufactured, and/or provided by the user). The infringement exposure values may vary according to the various characteristic data, with each characteristic analyzed on its own or in combination with other characteristic data. For example, the infringement exposure value for a given revenue source may be higher for a revenue source having a litigation history (e.g., a previous infringement claim) and/or a limited IP footprint (e.g., if the user does not have any issued patents, trademarks, etc. for the given revenue source).

In some examples, the system may provide the one or more infringement exposure values to an insurer for review. For example, the system may provide the infringement exposure value(s) to one or more potential insurers that will be providing/carrying the policy. The insurer(s) will have the ability to review the infringement exposure value(s), along with the characteristic data and/or any other data accessible to the insurer(s). The insurer may provide feedback regarding the infringement exposure value(s) to the system. For example, the insurer may provide feedback that the infringement exposure value(s) are too high/low for the user and/or the given revenue source. Additionally, or alternatively, the feedback may indicate that the insurer requests more information to evaluate and/or accept the proposed infringement risk exposure value(s). The system may use the feedback to adjust infringement exposure value(s) and future analysis accordingly.

Additionally, or alternatively, the systems described herein may be configured to provide a rating and/or other metric for a particular potential-insured and/or may rank or otherwise prioritize potential-insureds. The rating may be based at least in part on the information described herein. The ranking may be based at least in part on the ratings of other potential insureds and/or on an exposure profile associated with a given insurer and/or insurer category. For example, a first exposure profile may be associated with a first insurer, and the first exposure profile may indicate a certain amount degree of exposure that the first insurer is willing to tolerate. A second exposure profile associated with a second insurer may indicate a lower or higher degree of exposure than the first insurer. These factors may be considered when ranking potential insureds. Additionally, in examples, a given exposure profile may include an exposure portfolio. The exposure portfolio may indicate a number of desired insureds that the insurer desires to insurer that have certain characteristics. For example, the insurer may desire to insure a relatively low number of high-exposure entities and a higher number of low-exposure entities, which may represent a diverse exposure portfolio. In these examples, depending on a current exposure portfolio and how policies that have been issued correlate to the exposure portfolio, a given entity and/or potential insurance policy may be ranked higher than others.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details pertaining to the above-mentioned techniques are described below with reference to several example embodiments of FIGS. 1-6. It is to be appreciated that while these figures describe example environments and devices that may utilize the claimed techniques, the techniques may apply equally to other environments, devices, and the like.

FIG. 1 illustrates a schematic diagram of an example environment 100 for intellectual property (IP) liability protection. In some examples, the environment 100 may include one or more user devices 102 associated with a user 104, also described herein as electronic devices 102 and/or client-side devices 102, and a policy generation system 106 that is remote from, but in communication with, the client-side electronic devices 102 via a network 108. The environment 100 may also include an insurer system 110 associated with an insurer 112 that is remote from, but in communication with, the user devices 102 and/or the policy generation system 104 via the network 108. The environment 100 may further include one or more third-party databases 114 that are remote from, but in communication with, the policy generation system 104 and/or the insurer system 110.

The user devices 102 may include components such as, for example, one or more processors 116, one or more network interfaces 118, memory 120, one or more displays 122, and/or one or more input elements 124. The memory 118 may include components such as, for example, one or more applications 124. As shown in FIG. 1, the user devices 102 may include, for example, a computing device, a mobile phone, a tablet, a laptop, and/or one or more servers. It should be understood that the examples provided herein are illustrative and should not be considered the exclusive examples of the components of the user device 102. Additionally, one or more of the components of the user device 102 may be generally utilized to perform one or more of the actions, operations, and/or steps described herein as being performed by the user 104.

The policy generation system 106 may include components such as one or more processors 128, one or more network interfaces 130, and/or memory 132. The memory 132 may include one or more components such as one or more policy-term generation components 134. It should be understood that the examples provided herein are illustrative and should not be considered the exclusive examples of the components of the policy generation system 106. Additionally, one or more of the components of the policy generation system 106 may be generally utilized to perform one or more of the actions, operations, and/or steps described herein.

For example, as described herein, the user 104 may submit a request to the policy generation system 106 for an insurance policy 140 associated with IP liability. For instance, the user 104 may submit a request for an insurance policy quote to the policy generation system 106. Along with the request, the user 104 may provide various information, such as information related to a business of the user 104. More specifically, the user may provide information relating to various characteristics of the user's 104 business, referred to herein as characteristic information 136. The characteristic information 136 may include information relating to various characteristics of the business such as classification information (e.g., one or more standard industrial classification (SIC) codes), an employee count, revenue information, litigation history, whether the company is publicly traded or privately held, and/or information regarding any IP assets. This information may be utilized by the system to determine one or more terms of an insurance policy 140 and/or generate an insurance policy 140 associated with a potential IP liability of the user.

Alternatively, or in addition, the policy generation system 106 may request information from the user 104 in response to receiving the request. For example, in response to receiving the request, the policy generation system 106 may provide an information request to the user 104. The information request may include an intake form requesting the characteristic information 136, as described herein. Additionally, if the policy generation system 106 determines that the initial characteristic information 136 provided by the user 104 along with the request does not contain all of the required information necessary to determine the policy terms, the policy generation system 106 may request additional characteristic information 136 from the user 104. In this way, the policy generation system 106 may ensure that all of the required information is gathered from the user 104.

Still further, in some examples, the policy generation system 106 may communicate with one or more third-party databases 114 that are remote from, but in communication with, the policy generation system 104 to gather information about the user 104. For example, upon receiving the request for the policy, the policy generation system 106 may communicate, via the network 108, with one or more third party databases 114 to obtain the required information associated with the characteristics of the user 104. The third-party database(s) 114 may include information regarding the user 104, such as information historically provided by the user 104, publicly available information regarding the user 104, and the like, for example. Alternatively, or in addition, the policy generation system 106 may access the third-party databases 114 in response to receiving the initial characteristic information 136 and/or the requested characteristic information 136 (e.g., from the information request or intake document). For example, should the provided characteristic information 136 not include all of the necessary information, the policy generation system 106 may access and/or receive information from the third-party databases 114 to obtain the missing information.

One the policy generation system 106 has received and/or accessed the required characteristic information 136 from the user 104 and/or the third-party database(s) 114, the system may utilize the characteristic information 136 to determine key characteristic data associated with the user 104. As described herein, the key characteristic data may include, but not be limited to, one or more SIC codes associated with the user 104. The SIC code(s) may include one or more four-digit codes used to classify an industry practiced by the business of the user 104. The key characteristic data may further include employment information associated with the user 104. For example, the employment information may include a number of employees of the user 104, the role of each employee, and the like. In addition, the key characteristic data may include a revenue size of the user 104. For example, the revenue data may include revenue of the user 104 for a predetermined period of time, such as annually, quarterly, and the like. Further, the key characteristic data may include a litigation history associated with the user 104. The litigation history may include data associated with a frequency, cost incurred, annualized expenditure for litigation costs, and information regarding each claim (e.g., bringing or defending a claim, ruling, settlement terms, etc.). Still further, the key characteristic data may include data indicating whether the user 104 has a company that is privately held or publicly traded.

Each of the key characteristic data components may be broken down by business unit, product service (e.g., any revenue-generating element), and/or SIC code of the user 104. For example, the business of the user 104 may have one or more units having one or more associated SIC codes, such as a subsidiary, multiple units with different product offerings, and the like. As such, the key characteristic data may be determined according to each business unit.

In addition, the key characteristic data may further include IP data associated with the user 104. For example, the characteristic information 136 may including information regarding one or more IP assets of the user 104 and indicating an IP footprint associated with the user 104. For instance, the user 104 may provide and/or the policy generation system 106 may access from the third-party database(s) 114, information regarding each IP asset of the user 104. Using this information, the policy generation system 106 may determine IP data associated with the user 104.

The information associated with the IP asset(s) may include a description of the IP associated with the user 104, types and identifiers of the IP and/or registration of the IP, the countries in which the IP is protected, a description of the IP strategy or function associated with each IP asset, origination, age, identification of the individuals and/or firms responsible for management and/or oversight of the IP portfolio, estimated revenue and profit attributable to the IP, identification and description of IP licensing to third parties, historical exercise of IP rights associated with products and/or services offered by the user, description of how revenues and/or profits from IP are distributed by each business unit and/or by country, previous valuations of the IP, copies of licenses and/or agreements related to the IP, identification of any known, unlicensed third-party use of the IP, identification of any IP that has been threatened, challenged, and/or subject to administrative and/or judicial actions, copies of standard employment contracts and identification of assignment provisions in those employment contracts, identification of key employees associated with the IP and whether those employees have left the user 104, the licensing of third-party intellectual property by the user 104, procedures to avoid infringement of third-party IP rights, whether the user 104 already has any insurance policies in place for theft of IP and/or liability for infringement of third-party IP, identification of potential purchasers of the IP, and/or identification of key competitors.

Utilizing the key characteristic data, the policy generation system 106 may analyze the key characteristic data to determine an infringement exposure value 138 associated with the user 104. The infringement exposure value 138 may indicate an exposure value that a claim for IP infringement will be brought against the user 104. For instance, the infringement exposure value 138 may represent an exposure value associated with a predicted frequency and/or severity of an IP infringement claim, and/or exposure of the user 104 to a given IP infringement claim. In particular, the infringement exposure value 138 may represent a predicted value of financial liability associated with the user 104 (e.g., costs, damages, settlements, etc. associated with the policy). Alternatively, or in addition, the infringement exposure value(s) 138 may be determined on a per product, service, and/or revenue source basis. For example, the policy generation system 106 may predict a liability for each revenue source of the user 104 (e.g., an exposure value that a claim for IP infringement will be brought in association with the given revenue source).

In addition, in examples described herein, the policy generation system 106 may determine the infringement exposure value(s) 138 in light of the IP data. For example, in light of the IP data, the infringement exposure value(s) 138 may be increased and/or decreased. For instance, if the IP data indicates that the user 104 has an issued patent in association with a revenue source, the infringement exposure value 138 associated with the user 104 and/or that revenue source may indicate a low exposure value because a third-party IP holder that makes a competing product may be risk an infringement counterclaim by the user under its issued patent. Alternatively, if the IP data indicates that the user 104 does not have any issued patents, or IP protection, for a given revenue source, the infringement exposure value 138 may indicate a high exposure value. In another example, if the IP data indicates that the user 104 already has an insurance policy in association with a given IP asset, the infringement exposure value 138 may likewise indicate a low exposure value (e.g., the policy issued under the system described herein would only apply to claims and/or coverage in excess of the policies already in place and, thus, would reduce the amount paid out by potential insurers).

It should also be understood that anywhere in this disclosure where the term "trade secret" is used, it should be noted to include not only trade secrets, but any document and/or data and/or information including confidential information, know-how, and other information, and not necessarily documents, data, and/or information meeting a legal definition of the term "trade secret."

In examples, the infringement exposure value(s) 138 may be provided to an insurer 112 for review. For example, the insurer 112, or insurance carrier, may include one or more potential individuals or companies that will carry the IP liability policy, or insurance policy 140, of the user 104. The infringement exposure value(s) 138 may be provided to the insurer system 110 via the network 114. The insurer 112 may then analyze the infringement exposure value(s) 138 to determine if the value(s) should be adjusted. For example, the insurer 112 may utilize additional information associated with the user 104, historical data, industry data, and the like, to determine if the infringement exposure value(s) 138 reflect an accurate or acceptable prediction of IP liability associated with the user 104. The insurer feedback data 142 may include other information and/or insurer 112 comments regarding the infringement exposure value(s) 138, such as any risk premium or discount assigned to the values based upon the overall portfolio of policies issued by the insurer or its exposure to risks associated with particular industries or technologies. The insurer 112 may provide, via the insurer system 110, insurer feedback data 142 to the policy generation system 106.

In examples, the policy-term generation component(s) 134 of the policy generation system 106 may utilize the infringement exposure value(s) 138 and/or the insurer feedback data 142 to determine an indication of terms for insuring the user 104. The policy generation system 106 may recommend terms for insuring the user 104 and/or generate an insurance policy 140 including all the terms for insuring the user 104. For example, the policy-term generation component(s) 134 may be stored in association with a managing general agent, with the managing general agent having the ability to generate and/or bind the insurer.

The insurance policy 140 may include, but not be limited to, terms associated with a co-insurance value (e.g., a deductible the user 104 is responsible for), defense and/or resolution coverage, contractual indemnity responsibilities, loss mitigation procedures, and the like, for example. The insurance policy 140 may be provided to the user device 102 for review and acceptance by the user 104. In addition, the insurance policy 140 may be provided to the insurer 112 for review and acceptance. In response to both parties, the user 104 and the insurer 112, accepting the terms of the insurance policy 140, the policy will be finalized by the insurer 112 and become effective.

As shown in FIG. 1, several of the components of the policy generation system 106 and the associated functionality of those components as described herein may be performed by one or more of the other systems and/or by the user device 102. Additionally, or alternatively, some or all of the components and/or functionalities associated with the user device 102 may be performed, at least in part, by the policy generation system 108.

It should be noted that the exchange of data and/or information as described herein may be performed only in situations where a user has provided consent for the exchange of such information. For example, a user may be provided with the opportunity to opt in and/or opt out of data exchanges between devices and/or with the systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 116 and/or 128, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 116 and/or 128 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 116 and/or 128 may possess its own local memory, which also may store program components, program data, and/or one or more operating systems.

The memory 124 and/or 132 may include volatile and nonvolatile memory, removable and non-removable media implemented in any method or technology for storage of information, such as computer-readable instructions, data structures, program component, or other data. Such memory 124 and/or 132 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 124 and/or 132 may be implemented as computer-readable storage media ("CRSM"), which may be any available physical media accessible by the processor(s) 116 and/or 128 to execute instructions stored on the memory 124 and/or 136. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 124 and/or 136, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 118 and/or 130 may enable messages between the components and/or devices shown in architecture 100 and/or with one or more other remote systems, as well as other networked devices. Such network interface(s) 118 and/or 130 may include one or more network interface controllers (NICs) or other types of transceiver devices to send and receive messages over a network 108.

For instance, each of the network interface(s) 118 and/or 130 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 118 and/or 130 may include a wide area network (WAN) component to enable message over a wide area network.

Figure 2:
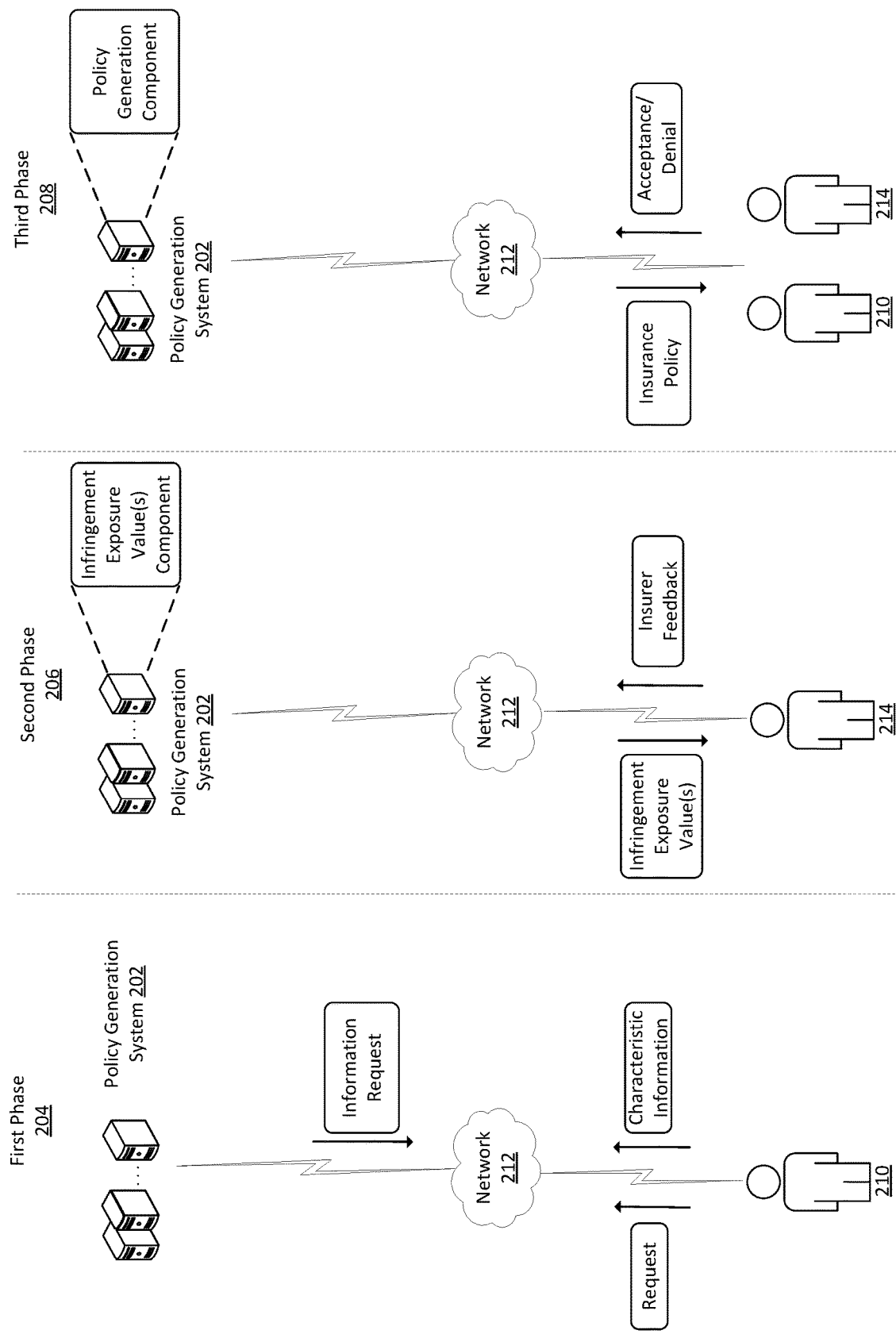
FIG. 2 illustrates example phases for initiating IP liability protection.

FIG. 2 illustrates example phases for initiating IP liability protection utilizing a policy generation system 202, such as system 106 of FIG. 1. The example phases may include a first phase 204, a second phase 206, and a third phase 208. The phases described herein illustrate the phases of a user requesting and receiving an insurance policy pertaining to IP liability, as described herein.

For example, in the first phase 204, a user 210 may submit a request for insurance to the policy generation system 202 via a network 212. The user 210 may submit the request through an application or web-based interface of a user device, such as user device(s) 102 described in FIG. 1. The request may include information about the user 210 and/or a business associated with the user 210. The policy generation system 202 may analyze the information to generate characteristic data associated with one or more key characteristics of the user 210.

Alternatively, or in addition, in response to receiving the request from the user 210, the policy generation system 202 may provide an information request to the user 210 requesting information associated with the one or more key characteristics. For example, the user 210 may be provided with an intake document requesting various information associated with one or more key characteristics of the user 210. The intake document may vary in length and depth of information requested.

Using this information, the policy generation system 202 may analyze the provided information to generate characteristic data associated with the key characteristics of the user. The characteristic data may include one or more classification codes associated with the business of the user 210 (e.g., one or more standard industrial classification (SIC) codes), an employee count, revenue information, litigation history, whether the company is publicly traded or privately held, and/or information regarding any IP assets.

In some examples, the policy generation system 202 may analyze the information provided by the user 210 and determine that information associated with the key characteristics is missing. In this example, the system may request additional information from the user 210. Alternatively, or in addition, the system may access one or more local and/or third-party databases containing information about the user 210. For example, the user 210 may have previously provided information to the policy generation system 202 and/or the policy generation system 202 may have gathered information associated with the user 210 (e.g., historical information such as preferences, transactions, etc.). The information may have been stored in a component of the policy generation system 202. Alternatively, or in addition, the policy generation system 202 may communicate with one or more third-party databases having information associated with the user 210. For example, the policy generation system 202 may access a third-party database and/or submit a request for information associated with the user 210.

In the second phase 206, an infringement exposure value(s) component of the policy generation system 202 may determine one or more exposure value(s) associated with the user 210. As described herein, the infringement exposure value(s) may represent a predicted exposure value that an IP infringement claim may be brought against the user 210. In particular, the infringement exposure value(s) may indicate a predicted frequency and/or severity of potential infringement claims against the user 210 (e.g., a number of claims that may be brought against the user 210 annually and a predicted value of monetary liability), and/or an exposure (e.g., how exposed the user 210 is to infringement claims, based upon what IP protection the user 210 has in place or other mitigation measures that may have been taken such as through freedom-to-operate analyses, design-around practices, and/or licensing of third-party IP).

For example, the infringement exposure value(s) component may analyze the characteristic data associated with the key characteristics of the user 210 to determine the infringement exposure value(s). For instance, the key characteristic data may indicate that the user 210 has a history of infringement litigation. In this example, the infringement exposure value component(s) may determine a high infringement exposure value for the user 210. In another example, the key characteristic data may indicate that the user 210 is a large corporation that produces many and varied products, thus potentially creating a higher exposure that the user 210 will have an infringement claim brought against one of them. Still further, the key characteristic data may include IP asset information (e.g., the IP footprint of the user 210). For instance, in the previous example, while the infringement exposure value(s) component may have ordinarily determined a higher infringement exposure value for the user 210 due to the large number and/or varied scope of product offerings, the IP asset information may indicate that the user 210 have IP assets (e.g., one or more patents and/or other types of IP protection) that reduce risks associated with the product offerings. In this example, in light of the IP assets associated with the product offerings, the infringement exposure value(s) component may determine a lower infringement exposure value associated with the user 210, thus indicating a lower exposure value of an IP infringement claim being brought against the user 210.

In examples, the infringement exposure value component(s) may utilize one or more machine learning techniques to determine the infringement exposure value(s) associated with the user 210. For example, the infringement exposure value component(s) may execute one or more algorithms (e.g., decision trees, artificial neural networks, association rule learning, or any other machine learning algorithm) to train the system to determine the one or more infringement exposure values based on historical user data, transactional data, policy performance, and the like. In examples, the machine learning component(s) may execute any type of supervised learning algorithms (e.g., nearest neighbor, Naïve Bayes, Neural Networks, unsupervised learning algorithms, semi-supervised learning algorithms, reinforcement learning algorithms, and so forth).

Once the infringement exposure value(s) have been determined, the infringement exposure value(s) may be provided to an insurer 214 for evaluation. The insurer 214 may represent an insurance carrier, or, specifically, one or more potential individuals or companies that will carry the insurance policy. The infringement exposure value(s) 138 may be provided to the insurer system 110 via the network 212. The insurer 214 may receive the infringement exposure value(s) and perform an analysis to determine if the value(s) accurately or acceptably reflect the predicted IP liability of the user 210. The insurer 214 may utilize both local and third-party information to perform the analysis. For example, the insurer 214 may evaluate the infringement exposure value(s) in light of historical information associated with the user 210 and/or one or more additional users. For instance, the insurer 214 may look at other users having shared key characteristic data with the user 210 (e.g., having a shared SIC code) to evaluate whether the infringement exposure value is too high or too low for a given industry.

Once the insurer 214 has analyzed the infringement exposure value(s), the insurer 214 may provide feedback data to the policy generation system 202. The policy generation system 202 may utilize the feedback data to perform any necessary adjustments to the infringement exposure value(s). For example, if the feedback data indicates that the infringement exposure value is too low for a particular revenue source, the policy generation system 202 may increase the infringement exposure value for the revenue source. In addition, the insurer feedback may include feedback regarding particular terms to be included in the insurance policy. For example, in response to determining that the infringement exposure value(s) associated with the user 210 should be higher, the insurer 214 may also provide feedback regarding the co-insurance value the user 210 will be responsible for (e.g., indicating that a higher deductible value should be outlined in the policy).

In the third phase 208, a policy-term generation component of the policy generation system 202, may determine and/or generate one or more terms of a policy quote and/or an insurance policy. For example, utilizing the initial and/or adjusted infringement exposure value(s), along with the insurer feedback, the policy-term generation component may determine one or more terms and conditions of a potential insurance policy for the user. Alternatively, or in addition, the policy-term generation component may generate a full insurance policy, outlining all terms and conditions of the policy. The policy generation system 202 may then provide an indication of the terms and/or the insurance policy to at least one of the user 210 and/or the insurer 214 for acceptance. For example, the policy generation system 202 may initially provide an indication of the terms and/or policy to the user 210. Upon acceptance of the terms, the policy-term generation component may generate a full insurance policy and/or may provide an indication of the acceptance to one or more insurers to generate the policy. Alternatively, the policy-term generation component may generate a full insurance policy and provide the insurance policy to the user 210 and/or the insurer 214 for acceptance. Once the policy is accepted by both the user 210 and the insurer 214, the policy may be finalized by the insurer 214 and become effective.

Figure 3:
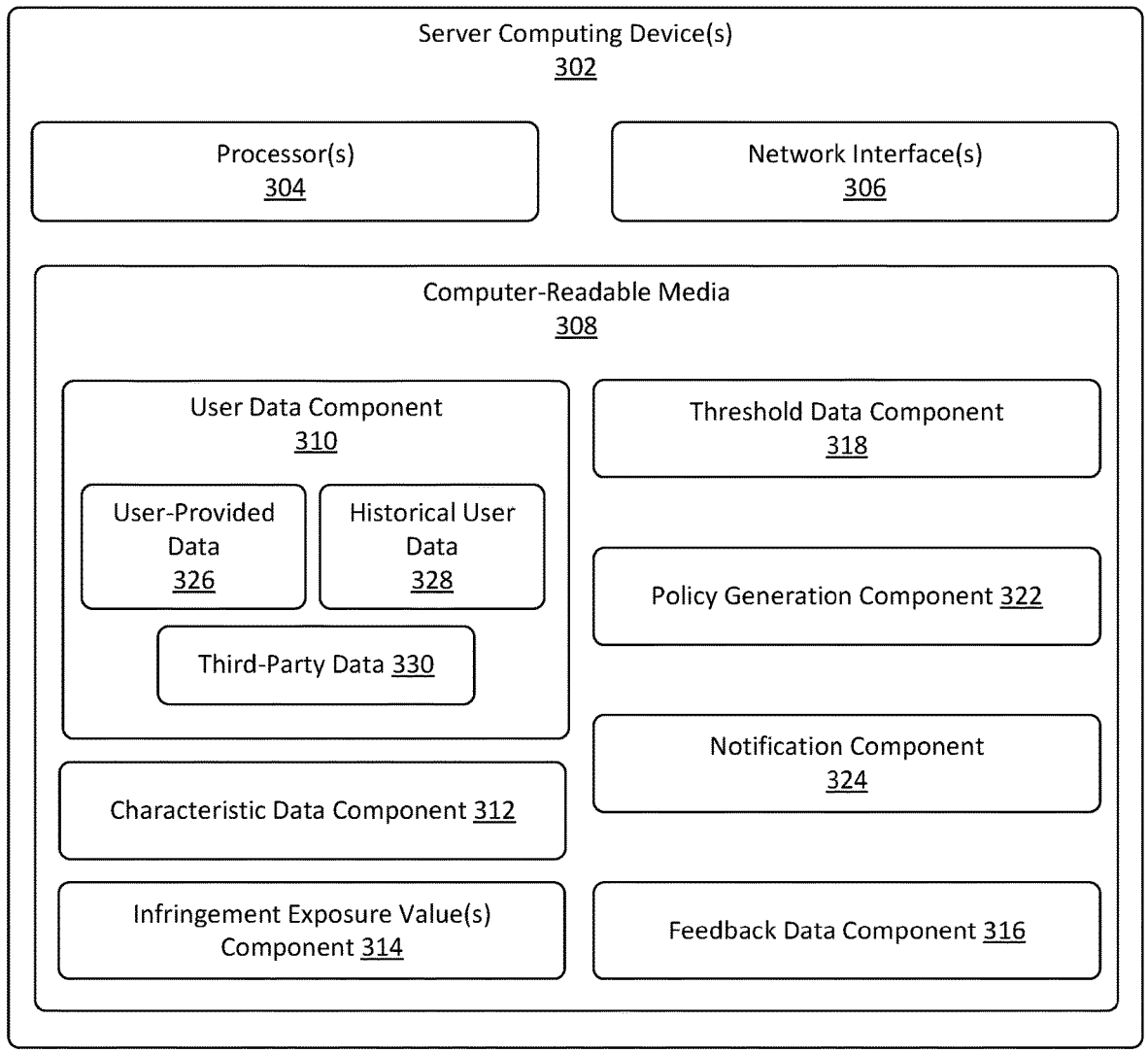
FIG. 3 illustrates an example server computing device that may be used for IP liability protection.

FIG. 3 illustrates an example server computing device that may be used for IP liability protection. As described herein, one or more user computing devices, such as the user device(s) 102 of FIG. 1, can communicate with one or more intermediary computing devices, such as the policy generation system 300 described herein. The server computing device(s) 302 ("server(s)" hereinafter) can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 302 as being present in a single location, these components and data can alternatively be distributed across different computing devices and different locations in any manner. In some examples, such components and data can be distributed across user computing devices, as described herein. The functions can be implemented by one or more server computing devices, with the various functionality described above distributed in various ways across the different computing devices. Multiple server(s) 302 can be located together or separately, and organized, for example, as virtual servers, server banks and/or server farms.

In some examples, the server(s) 302 may perform the same or similar functions as the policy generation system described in FIGS. 1 and 2. The server(s) 302 may comprise processor(s) 304 that are operatively connected to network interface(s) 306 and a computer-readable media 308. Each processor 304 can be a single processing unit or a number of processing units and can include single or multiple computing units or multiple processing cores. The processor(s) 304 can be implemented as one or more microprocessors, microcomputers, microcontrollers, digital signal processors, central processing units, state machines, logic circuitries, and/or any devices that manipulate signals based on operational instructions. For example, the processor(s) 304 can be one or more hardware processors and/or logic circuits of any suitable type specifically programmed or configured to execute the algorithms and processes described herein. The processor(s) 304 can be configured to fetch and execute computer-readable instructions stored in the computer-readable media 308, which can program the processor(s) 304 to perform the functions described herein.

The computer-readable media 308 can include volatile and nonvolatile memory and/or removable and non-removable media implemented in any type of technology for storage of information, such as computer-readable instructions, data structures, program modules, or other data. Such computer-readable media 308 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 302, the computer-readable media 308 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 308 can be used to store any number of functional components that are executable by the processor(s) 304. In many implementations, these functional components comprise instructions or programs that are executable by the processor(s) 304 and that, when executed, specifically configure the one or more processors 304 to perform the actions attributed above to the automated negotiation system. Functional components stored in the computer-readable media 308 can include a user data component 310, characteristic data component 312, infringement exposure value(s) component 314, feedback data component 316, threshold data component 318, policy-term generation component 322, as well as a notification component 324.

In examples, the computer-readable media 308 may include the user data component 310. The user data component 310 may be configured to receive, access, and/or store user-provided data 326, historical user data 328, and/or third-party data 330. The user data component 310 may be configured to receive, access, and/or store data associated with a user and/or the user's business. For example, the buyer data component 310 may be configured to receive user-provided data 326 from a user along with a request for an insurance policy quote and/or in response to a request for information. The user-provided data 326 may include data associated with one or more key characteristics of the user. For example, the user-provided data 326 may include information associated with an industry classification of each sector of the user's business (e.g., an SIC code for each individual unit of the business), employment information (e.g., a number of employees overall, a number of employees within each business unit, etc.), revenue information, a litigation history, whether the company is publicly traded or privately held, and/or IP information related to each of the user's IP assets.

The user data component 310 may further include historical user data 328. For example, the user data component 310 may be configured to receive, access, and/or store user-historical user data 328 associated with the user. The historical user data 328 may include data associated with historical transactions between the user and the policy generation system and/or user preferences, such as references regarding user interface settings, notification preferences, and the like, for example. Additionally, the user data component 310 may further include third-party data 330. For example, the user data component 310 may include data received and/or accessed from a third-party database. The third-party data 330 may be associated with the key characteristics associated with the user. For example, the system may determine that the user-provided data 326 and/or the historical user data 328 does not include all of the necessary information associated with the key characteristics. In response, the system may submit a request to one or more third-party databases for additional information. Alternatively, or in addition, the system may be configured to receive information associated with the user from the one or more third-party databases. The user data component 310 may be configured to access and/or receive such data, as described herein, via the network interface 306 of the server computing device 302.

In examples, the computer-readable media 308 may further include a characteristic data component 312. The characteristic data component 312 may be configured to generate characteristic data associated with the key characteristics of the user described herein. For example, the characteristic data component 312 may be configured to access receive and/or access data from the user data component 310. The characteristic data component 312 may analyze the data to generate characteristic data representing each of the key characteristics of the user. For example, the characteristic data component 312 may be configured to access the user-provided data 326 of the user data component 310. The user-provided data 326 may include employment information associated with the user. The characteristic data component 310 may then analyze the employment information to generate characteristic data indicating an employee count (e.g., a key characteristic) for each unit of the user's business. In another example, the user-provided data 326 may include revenue information associated with the user, such as financial statements, fiscal reports, tax documents, and the like. The characteristic data component 310 may then analyze the revenue information to generate characteristic data indicating an annual revenue (e.g., a key characteristic) for each unit of the user's business. In a further example, the characteristic data component 312 may be configured to access the third-party data 330 of the user data component 310. The third-party data 330 may include information associated with a litigation history of the user. The characteristic data component 310 may analyze the litigation history information to determine key characteristics of the user, such as litigation costs incurred on an annual basis, settlement terms, and the like, for example.

The computer-readable media 308 may further include an infringement exposure value(s) component 314. The infringement exposure value(s) component 314 may be configured to determine one or more infringement exposure values associated with the user, and/or each revenue source of the user, described herein. The infringement exposure value(s) may include one or more values indicating a predicted exposure that a legal claim may be brought against the user. As described herein, a legal claim or infringement claim may include any claim, brought against the user by a third-party, that the user has, by the exercise of its rights in association with an revenue source, infringed on or misappropriated the IP of a third party, including patent infringement resulting from the manufacture, sale, or use of the borrower's product(s) or service(s).

For example, the infringement exposure value(s) component 314 may be configured to receive and/or access characteristic data of the characteristic data component 312. The characteristic data may include data representing each of the key characteristics associated with the user. The infringement exposure value(s) component 314 may analyze the characteristic data to determine one or more infringement exposure value(s) associated with the user. For example, the infringement exposure value(s) component 314 may analyze the characteristic data representing the key characteristics including the SIC code(s), employee count, revenue size, litigation history, and/or publicly traded or privately held nature of the user's business to predict an exposure value that the user will have a claim for infringement brought against them.

In addition, as described herein, the infringement exposure value(s) component 314 may utilize one or more machine learning techniques to determine the infringement exposure value(s) associated with the user. For example, the infringement exposure value(s) component 314 may execute one or more algorithms (e.g., decision trees, artificial neural networks, association rule learning, or any other machine learning algorithm) to train the system to determine the one or more infringement exposure values. The training data may include characteristic data of the user, historical characteristic data, historical user data, transactional data, historical policy performance, and the like. In examples, the machine learning component(s) may execute any type of supervised learning algorithms (e.g., nearest neighbor, Naïve Bayes, Neural Networks, unsupervised learning algorithms, semi-supervised learning algorithms, reinforcement learning algorithms, and so forth).

In addition, in some examples, infringement exposure value(s) component 314 may further analyze the characteristic data in light of the IP information associated with the user (e.g., the IP footprint). For example, when determining an exposure value for an revenue source of the user, the infringement exposure value(s) component 314 may analyze the characteristic data in light of the IP footprint associated with the revenue source. In this example, if the user has IP protection (e.g., issued patents, trademarks, etc.) in place for the revenue source, the infringement exposure value determined may indicate a low exposure of an infringement claim being brought against the user in association for the particular revenue source (e.g., if the user has numerous issued patents for the revenue source, there may be a lower exposure that a claim will be brought against the user, the cost of defending the claim may be low, the user is likely to prevail, etc.). In contrast, if the characteristic data indicates that the user has an extensive litigation history for infringement claims, the infringement exposure value(s) may indicate that there is a high exposure that an infringement claim may be brought against the user and/or that the cost of defending such claims may be high, loss mitigation costs may be high, and the like, for example.

The computer-readable media 308 may further include feedback data component 316. In examples, the feedback data component may be configured to store feedback data regarding the infringement exposure value(s) of the infringement exposure value(s) component 314. For example, the feedback data component 316 may be configured to receive and/or access the infringement exposure value(s) and provide an indication of the infringement exposure value(s) to one or more insurers that may carry the IP liability policy. In response to receiving an indication of the infringement exposure value(s), the insurer(s) may provide feedback regarding an accuracy of the value(s) (e.g., whether the value(s) are accurate, too high, too low, etc.). The feedback data component 316 may be configured to receive the feedback data via the network interface(s) 306 and store the feedback data for use by the system.

The computer-readable media 308 may further include a threshold data component 318. In examples, the threshold data component 318 may include threshold information associated with the infringement exposure value(s) indicating a predetermined threshold value under which the infringement exposure value(s) should fall and/or exceed. For example, the policy generation system may be configured to analyze characteristic data associated with users to determine users that may be targeted for IP liability policies. For instance, users having a low exposure value may be considered for targeted offerings or other insurance policy indications. In this example, the threshold data component 318 may include information associated with a predetermined threshold value which the infringement exposure value(s) should not exceed for the user to be targeted for a policy offering. Alternatively, in some examples, the predetermined threshold value may indicate values above which the infringement exposure value(s) should fall for the user to be targeted for a policy offering (e.g., in some examples the threshold value(s) may indicate a minimum threshold above which the infringement exposure value must be).

In some examples, the threshold data may be provided by an insurer. In other examples, the system may determine the threshold data value(s) based on one or more historical data points, such as historical data associated with one or more additional users (e.g., based on threshold values associated with users that have not had an infringement claim brought against them, users having low policy payout values, etc.). For example, the system may utilize one or more machine learning techniques to determine the threshold data value(s). For example, a machine learning component(s) (not shown) of the threshold data component 318 may execute one or more algorithms (e.g., decision trees, artificial neural networks, association rule learning, or any other machine learning algorithm) to train the system to determine the one or more threshold values. In examples, the machine learning component(s) may execute any type of supervised learning algorithms (e.g., nearest neighbor, Naïve Bayes, Neural Networks, unsupervised learning algorithms, semi-supervised learning algorithms, reinforcement learning algorithms, and so forth).

In examples, the computer-readable media 308 may further include a policy-term generation component 322. For example, the policy-term generation component 322 may be configured to receive and/or access metrics associated with insuring a user and/or the user response data associated with such metrics. The policy-term generation component 322 may determine one or more terms of an IP liability policy and/or generate the IP liability policy for the user. For example, the policy-term generation component 322 may analyze the user response data and determine that the user has accepted the metrics for insuring. In response, the policy-term generation component 322 may generate an IP liability policy including at least the accepted metrics for insuring the user.

Alternatively, or in addition, the policy-term generation component 322 may be configured to receive and/or access data from the user data component, the characteristic data component 312, infringement exposure value(s) component 314, and/or the feedback data component 316. Utilizing this data, the policy-term generation component 322 may determine one or more terms of a policy for the user. The policy-term generation component 322 may further determine other terms and conditions for insuring the user for inclusion in the policy. For example, the policy-term generation component 322 may further determine a co-insurance value (e.g., a deductible value the user is responsible for), indemnity provisions (e.g., which customer indemnities will be covered under the policy), loss mitigation terms (e.g., the terms under which loss mitigation techniques may be employed, coverage of costs for loss mitigation, etc.), and the like.

The policy-term generation component 322 may further be configured to provide an indication of the one or more terms and/or the IP liability policy to the user and/or the insurer(s) for acceptance. Once the term(s) and/or the policy have been accepted by the user and/or the insurer(s), the policy-term generation component 322 may provide an indication of the user acceptance to the insurer(s). The insurer(s) may utilize the indication of acceptance to finalize the policy.

The computer-readable media 308 may further include notification component 324. The notification component 324 may be configured to receive and/or access and/or store indications from the user and/or the insurer regarding notification preferences. For example, the notification component 324 may receive and/or access the user-provided data 326 of the user data component 310. The user-provided data 326 may include information regarding preferences of the user for receiving notifications from the policy generation system. For example, the user may indicate preferences for a type of notification they wish to receive (e.g., an email, text, etc.), a preferred device for receiving indications, and the like. Further, the notification component 324 may be configured to receive indications of user and/or insurer notification preferences directly from devices associated with the user and/or insurer. For example, the notification component 324 may be configured to receive indications of user preferences via the network interface(s) 306.

Figure 4:
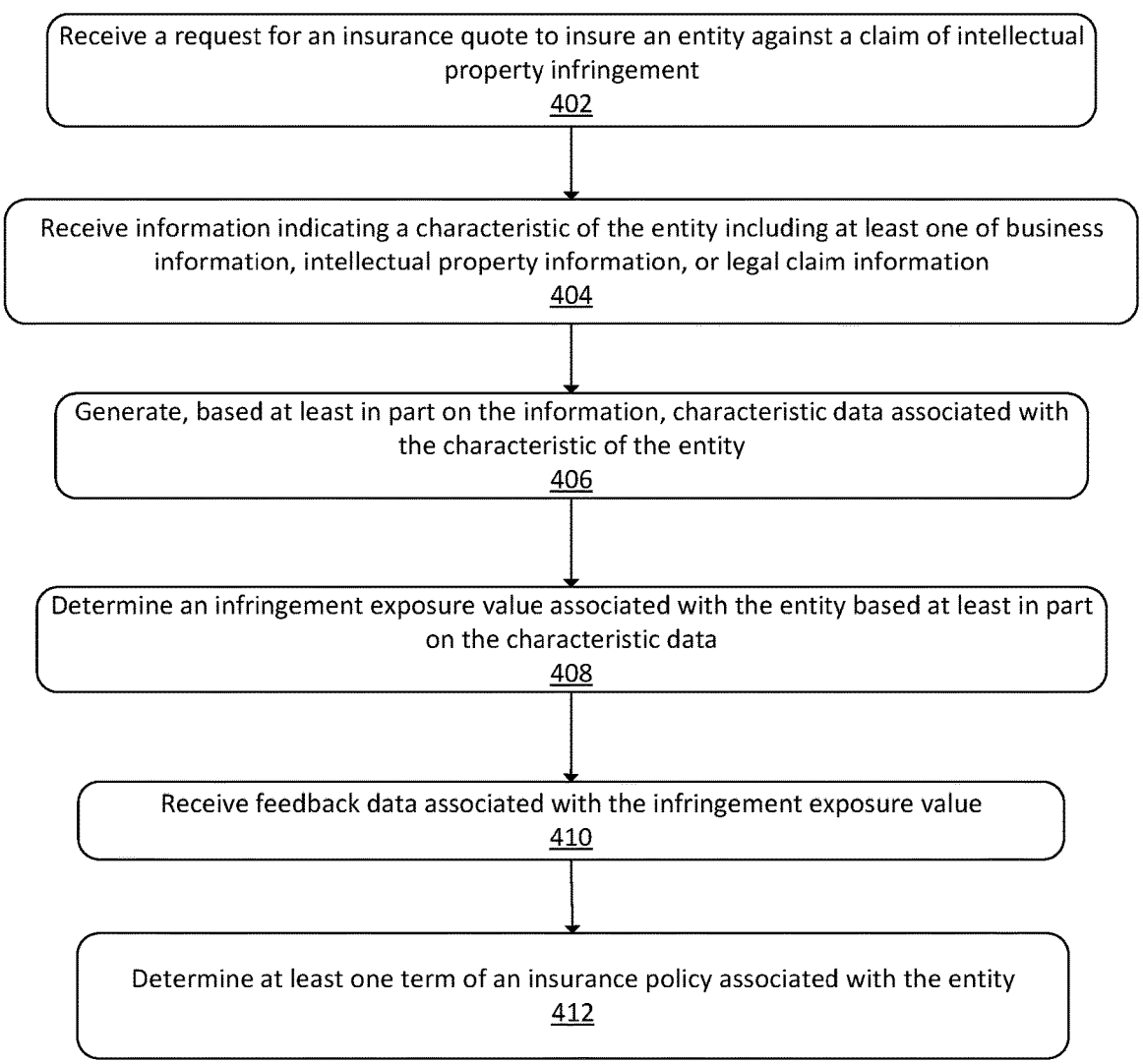
FIG. 4 illustrates a flow diagram of an example process for IP liability protection.
Figure 5:
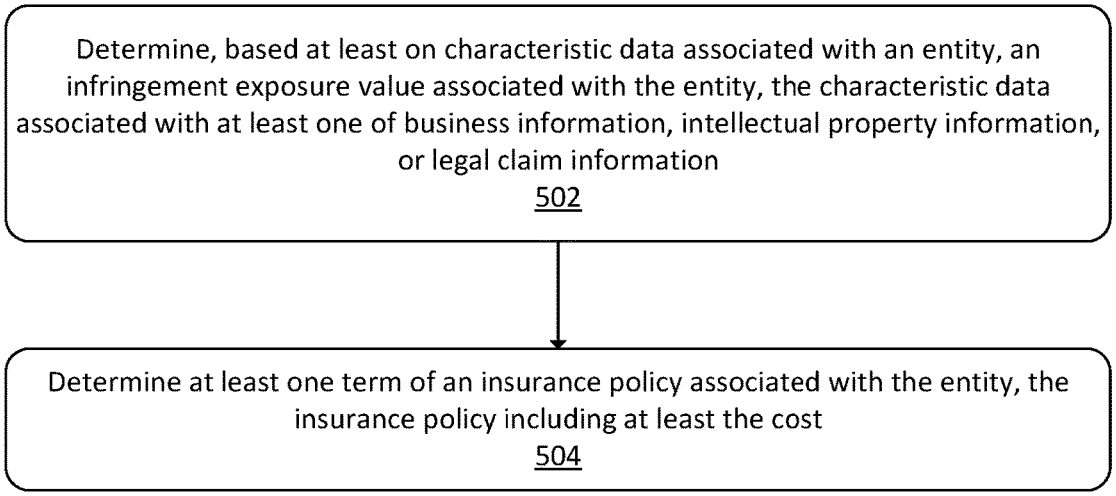
FIG. 5 illustrates a flow diagram of another example process for IP liability protection.
Figure 6:
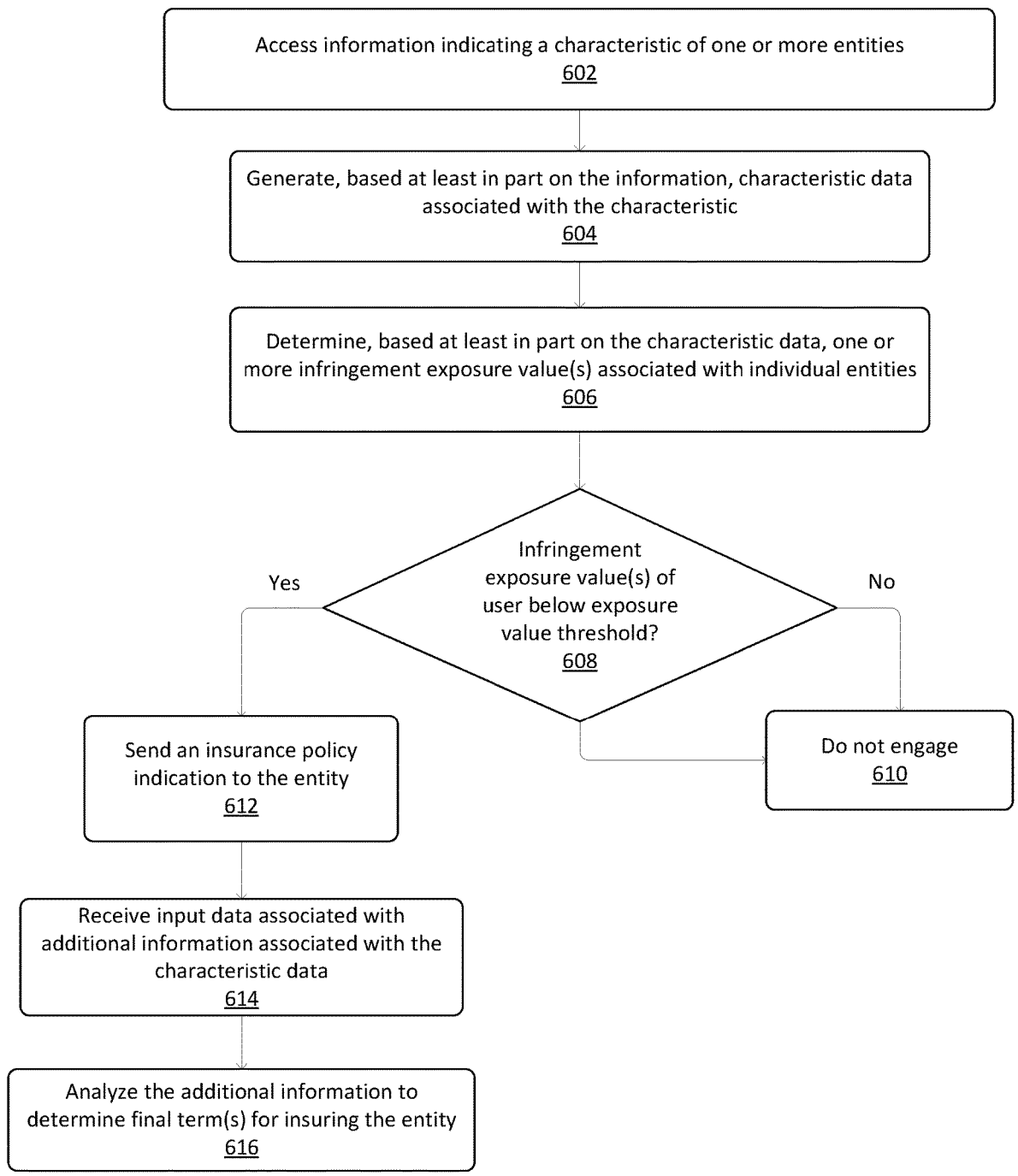
FIG. 6 illustrates a flow diagram of another example process for IP liability protection.

FIGS. 4-6 illustrate various a flow diagrams of example processes for IP liability protection. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3, although the processes may be implemented in a wide variety of other environments, architectures and systems.

FIG. 4 illustrates a flow diagram of an example process 400 for IP liability protection. The order in which the operations or steps are described is not intended to be construed as a limitation, and any number of the described operations may be combined in any order and/or in parallel to implement process 400. The operations described with respect to the process 400 are described as being performed by one or more individuals and/or teams of individuals. However, it should be understood that some or all of these operations may be performed by some or all of components, devices, and/or systems described herein.

At block 402, the system may receive a request for an insurance quote to insure a user against a claim of intellectual property infringement. For example, a user may submit a request to the policy generation system for an IP liability policy (e.g., an insurance quote). The IP liability policy may include an insurance policy protecting the user against claims for IP infringement.

At block 404, the system may receive information indicating a characteristic of the user, including at least one of business information, intellectual property (IP) information, or legal claim information. For example, the system may be configured to receive information associated with one or more key characteristics of the user. The key characteristics may be associated with business information (e.g., SIC code(s) associated with each unit of the user's business, employee count of each unit, a revenue size of the business and/or each unit, and/or whether the user's business is privately held or publicly traded), IP information (e.g., an IP footprint associated with each revenue source of the user), and/or legal claim information (e.g., a litigation history of the user, costs incurred in defense of IP infringement claims, whether the user was the plaintiff or defendant, and/or the terms of the verdict/settlement).

In some examples, the user may provide the information along with the initial request. Alternatively, or in addition, the system may be configured to request the information from the user in response to the initial request and/or in response to receiving information from the user. For example, in response to receiving the information from the user along with the request, the system may determine that additional information is required. In this instance, the system may be configured to request additional information from the user. Still further, in some examples, the system may be configured to receive information from one or more databases having information associated with the key characteristics of the user, such as a local database and/or a third-party database.

At block 406, the system may generate, based at least in part on the information, characteristic data associated with the characteristic of the user. In examples, the system may be configured to analyze the information to generate characteristic data associated with one or more key characteristics of the user. For instance, the system may be configured to analyze the information received from the user, requested from the user, and/or accessed from the local and/or third-party databases(s) to generate the characteristic data. For example, the system may receive business information, such as expense reports, tax documents, revenue documents, and the like. The system may be configured to analyze the business information to generate characteristic data indicating a revenue size (e.g., annual revenue, quarterly revenue, etc.) of each unit of the user's business. The characteristic data indicating the revenue size may be stored in association with the user as a key characteristic. As described herein, the key characteristics may include, but not be limited to, SIC code(s), employee count, revenue size, litigation history, and/or the whether the user's business is publicly or privately held. In addition, in some examples, the key characteristics may further include IP information indicating an IP footprint of each revenue source of the user.

At block 408, the system may determine an infringement exposure value associated with the user based at least in part on the characteristic data. For example, the system may be configured to analyze the characteristic data to determine one or more infringement exposure value(s) associated with the user. The infringement exposure value(s) may represent a value indicating a predicted exposure that a claim for IP infringement will be brought against the user. For example, the system may be configured to analyze the characteristic data associated with the litigation history of the user. If, for example, the characteristic data associated with the litigation history of the user indicates that the user has had numerous IP infringement claims asserted against them, the infringement exposure value associated with the user may indicate a high predicted exposure that a future claim will be brought against the user. In some examples, the infringement exposure value(s) may also be determined on a per revenue source basis. For example, the system may be configured to analyze the characteristic data associated with the litigation history of the user to determine a predicted exposure that an infringement claim will be brought against the user in association with a particular revenue source. In this instance, the system may be configured to analyze characteristic data associated with each revenue source of the user, individually. As such, the system may determine an infringement exposure value in association with each revenue source.

At block 410, the system may receive feedback data associated with the infringement exposure value. For example, the system may be configured to provide an indication of the infringement exposure value(s) to one or more potential insurer(s) that will carry the policy. As such, the system may provide an indication of the infringement exposure value(s) to a device of the insurer(s).

The system may then receive feedback data from the insurer associated with the infringement exposure value(s). In examples, the system may be configured to receive feedback data generated by the insurer(s) regarding the infringement exposure value(s) that have been provided. In response to receiving the infringement exposure value(s), the insurer(s) may evaluate the value(s), along with the characteristic data and/or additional information associated with the user, to determine whether the infringement exposure value(s) accurately reflect the IP liability exposure (e.g., exposure of an infringement claim) associated with the user. Based on the analysis, the insurer(s) may generate feedback indicating whether the infringement exposure value(s) should remain as determined by the system or should be adjusted based on the analysis. The insurer(s) may then provide the feedback data to the system for further analysis.

At block 412, the system may determine at least one term of an insurance policy associated with the user. In examples, the system may be configured to determine one or more terms of the insurance policy and/or generate the insurance policy. For example, the terms may further include loss mitigation procedures, indemnity coverage, litigation procedures, and the like. In examples, the system may also provide an indication of the one or more terms and/or the generated insurance policy to at least one of the user and/or the insurer for acceptance. For example, the system may be configured to provide the generated policy to the user and/or the insurer(s) for acceptance. Once the user has accepted the policy, the system may be configured to provide an indication of the acceptance to the insurer(s). As such, the insurer(s) may take steps to finalize the insurance policy.

FIG. 5 illustrates a flow diagram of an example process 500 for IP liability protection. The order in which the operations or steps are described is not intended to be construed as a limitation, and any number of the described operations may be combined in any order and/or in parallel to implement process 500. The operations described with respect to the process 500 are described as being performed by one or more individuals and/or teams of individuals. However, it should be understood that some or all of these operations may be performed by some or all of components, devices, and/or systems described herein.

At block 502, the system may determine, based at least on characteristic data associated with a user, an infringement risk value associated with the user, the characteristic data associated with at least one of business information, intellectual property information, or legal claim information. For example, as described herein, the system may receive a request for an insurance quote from a user. For example, as described herein, the user may submit a request to the policy generation system for an IP liability policy (e.g., an insurance quote). The IP liability policy may include an insurance policy protecting the user against claims for IP infringement. For example, the insurance policy may include terms for reimbursement of costs accrued in defense of an IP infringement claim brought against the user.

Along with the request, the user may include information (e.g., an intake document) associated with one or more key characteristics of the user. As described herein, the key characteristics may include, but not be limited to, SIC code(s), employee count, revenue size, litigation history, and/or the whether the user's business is publicly or privately held. In addition, in some examples, the key characteristics may further include IP information indicating an IP footprint of each revenue source of the user. In addition, in response to receiving the request, the system may be configured to request information associated with the key characteristics. Alternatively, or in addition, the system may be configured to receive information from and/or access one or more local and/or third-party databases having information associated with the key characteristics of the user. As described herein, utilizing the information from the user (provided and/or requested) and/or the information from the one or more databases(s), the system may analyze the information to generate characteristic data associated with the key characteristics of the user.

In examples, the system may analyze the characteristic data associated with the user to determine infringement exposure value(s) associated with the user. For example, the system may be configured to analyze the characteristic data, determined from the user-provided and/or database information, to determine one or more infringement exposure value(s) associated with the user. In examples, the system may determine infringement exposure value(s) indicating a predicted exposure that a claim for IP infringement will be brought against the user. In particular, the infringement exposure value(s) may represent one or more values associated with a predicted exposure of IP liability of the user for future claims. For example, the system may analyze the characteristic data associated with IP information for revenue sources of the user. The system may determine that the user has one or more issued patents in associated with an revenue source of the user. As such, the system may determine an infringement exposure value(s) indicating a low predicted exposure that a claim for IP infringement will be brought against the user and/or a low chance of large costs that may be accrued in associated with a claim (e.g., if the user has an issued patent for the revenue source, there is a low likelihood that a party would assert a claim for infringement and/or a low likelihood that the party would prevail). In some examples, the infringement exposure value(s) may be determined on a per revenue source basis, or, alternatively, may represent an overall value associated with the user.

At block 504, the system may determine at least one term of an insurance policy associated with the user. For example, the terms may further include loss mitigation procedures, indemnity coverage (e.g., coverage in association with indemnity provisions the user has entered into with third-parties), litigation procedures, and the like.

FIG. 6 illustrates a flow diagram of an example process 600 for IP liability protection. The order in which the operations or steps are described is not intended to be construed as a limitation, and any number of the described operations may be combined in any order and/or in parallel to implement process 600. The operations described with respect to the process 600 are described as being performed by one or more individuals and/or teams of individuals. However, it should be understood that some or all of these operations may be performed by some or all of components, devices, and/or systems described herein.

At block 602, the system may access information indicating a characteristic of one or more users. For example, the system may be configured to receive and/or access information associated with one or more key characteristics of one or more users. As described herein, the key characteristics may include, but not limited to, one or more SIC codes associated with the users, employee counts, revenue sizes, litigation histories, whether companies associated with the users are publicly or privately held, and/or IP information associated with IP assets of the user. For example, the system may be configured to access one or more local or third-party databases(s) storing information associated with key characteristics of users that may be potentially insured. For instance, the system may be configured to access a local database storing information associated with one or more users (e.g., user-provided information, transactional data, etc.). Alternatively, or in addition, the system may be configured to access and/or receive information from one or more third-party databases storing information associated with the key characteristics of the user(s). In some examples, if the system is unable to gather all the necessary information in associated with each of the key characteristics, the system may still proceed with the process.

At block 604, the system may generate, based at least in part on the information, characteristic data associated with the characteristic. For example, the system may be configured to analyze the accessed information to generate characteristic data associated with one or more key characteristics of the potential users. For instance, the system may be configured to analyze the information received from and/or accessed from the local and/or third-party databases(s) to determine and generate the characteristic data. For example, the system may access information regarding the industries, services, and/or product offerings associated with the individual users from a third-party database. The system may be configured to analyze the information to generate characteristic data indicating one or more SIC codes of each business and/or business unit of the users. The characteristic data indicating the SIC codes may be stored in association with each user as a key characteristic.

At block 606, the system may determine, based at least in part on the characteristic data, one or more infringement exposure value(s) associated with individual users. In examples, the system may be configured to analyze the characteristic data of individual users to determine one or more infringement exposure value(s) associated with each of the users. As described herein, the infringement exposure value(s) may represent a value indicating a predicted exposure that a claim for IP infringement will be brought against the individual users.

For example, the system may be configured to analyze the characteristic data associated with the SIC code(s) of a user. For instance, the characteristic data associated with the SIC code(s) of the user may indicate that the industry, product offerings, and/or services provided by the user are associated with a higher exposure that an infringement claim being brought against the user. As such, the system may determine an infringement exposure value associated with the user indicating a high predicted exposure that a future claim will be brought against the user. The system may perform a similar analysis for individual users of the potential users. In some examples, the infringement exposure value(s) may also be determined on a per revenue source basis. As such, the system may determine an infringement exposure value in association with each revenue source.

At block 608, the system may determine whether an infringement exposure value(s) of a user is below an exposure value threshold. For example, the system may receive and/or access exposure threshold values under which infringement exposure values should fall. In examples, potential insurers (e.g., insurers that may carry the policy) may provide information regarding infringement exposure value thresholds under which infringement exposure values should fall in order for the insurer to agree to carry the IP liability policy. Alternatively, or in addition, the system may determine, based on historical data, policy transactions, and the like, a threshold value under which the infringement exposure value should fall in order for a user to be considered low exposure (e.g., the system may determine that users having an infringement exposure value under the threshold value are less likely to have a claim brought against them). Thus, at block 608, the system may analyze infringement exposure value(s) associated with individual users to determine if the value(s) fall under the threshold value.

Alternatively, in some examples, the system may determine whether an infringement exposure value of a user is above the exposure threshold value. In this instance, a user having a low exposure may be associated with a high exposure value (e.g., in this example, a high infringement exposure value may indicate a low exposure of the user to infringement claims).

If the system determines that the infringement exposure value(s) of the user is not below the infringement exposure value threshold, then at block 610 the system may determine that the user should not be engaged. For example, should the system that the infringement exposure value(s) of the user are not below the threshold (e.g., exceed the threshold), the system may determine that the user is a high exposure user (e.g., has a high predicted exposure that in infringement claim will be brought against them) and should not be engaged further. As such, the system will not target the user for policy offerings.

If, however, the system determines that the infringement exposure value of the user is below the infringement exposure value threshold, then the system may send an indication associated with the insurance policy to the user, as shown at block 612. For example, if the system determines that the infringement exposure value(s) of the user are below the threshold, the system may determine that the user is a low exposure user (e.g., has a low predicted exposure that an infringement claim will be brought against them) and therefore should be targeted for policy offerings. As such, the system may determine, based on the infringement exposure value(s), one or more terms for insuring the user.

At block 614, the system may receive input data associated with additional information associated with the characteristic data. For example, if the user provides an indication that they have accepted the terms, the system may request additional information, as needed, to finalize the policy. For example, the system may determine that additional information is needed in association with the key characteristics. As such, in response to sending the indication of the preliminary terms and/or receiving the acceptance of the preliminary terms, the system may provide the user with an intake document requesting the additional information. Alternatively, or in addition, in response to sending the indication of the preliminary terms and/or receiving the acceptance of the preliminary terms, the system may cause a GUI to be displayed having one or more input elements configured to receive the input data associated with the additional information.

At block 616, the system may analyze the additional information to determine a final term for insuring the user. In examples, the system may analyze the additional information to determine complete characteristic data associated with the user. Based on the characteristic data, the system may determine an updated infringement exposure value(s) associated with the user and one or more finalized terms for insuring the user. In addition, in some examples, the system may provide the updated information to the potential insurer(s) for analysis. The insurer(s) may provide feedback data which, in turn, the system may utilize to determine final terms for insuring the user. For example, the insurer(s) may further analyze the updated information to determine whether updated infringement exposure value(s) accurately reflect the IP liability of the user.

It should be understood that the example information described herein is used for illustrative purposes and is not by way of limitation. The information sought and/or received from the discovery document may be any information associated with the borrower 110 and/or the intellectual property.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
   one or more processors; and
   non-transitory computer-readable media storing instructions that, when executed by the one or more processors, cause the one or more processors to perform operations comprising:
   receiving a request for an insurance quote to insure a entity against a claim of intellectual property infringement;
   receiving information indicating a characteristic of the entity, the information including at least one of:
   business information;
   intellectual property information; or
   legal claim information;
   generating, based at least in part on the information, characteristic data associated with the characteristic of the entity;
   training a machine learning model configured to determine infringement exposure values associated with entities utilizing a training dataset including historical policy performance metrics such that a trained machine learning model is generated to weight characteristics of the entities;
   determining, based at least in part on the characteristic data and utilizing the trained machine learning model, an infringement exposure value associated with the entity;

receiving feedback data associated with the infringement exposure value;

determining, based at least in part on the infringement exposure value and the feedback data, a cost for insuring the entity against the claim of intellectual property infringement;

determining at least one term of an insurance policy associated with the entity, the insurance policy including at least the cost;

automatically generating policy data representing the insurance policy including the at least one term, the automatic generation of the policy data based at least in part on the characteristic data, the infringement exposure value, and the feedback data, and the automatic generation of the policy data performed absent user input and utilizing prior policy data generated in association with a prior insurance policy; and sending the policy data to a device, the policy data causing the device to display the insurance policy along with functionality for accepting the insurance policy.

2. The system of claim 1, wherein determining the infringement exposure value comprises determining the infringement exposure value based at least in part on a revenue source associated with the entity.

3. The system of claim 1, wherein:
the business information includes at least an industry classification, a number of employees, or a revenue value;
the intellectual property information includes at least one of:
  a number of intellectual property assets associated with the entity;
  a type of intellectual property of individual ones of the intellectual property assets;
  a licensing agreement associated with at least one of the intellectual property assets; or
  a second insurance policy associated with the at least one of the intellectual property assets; and
the legal claim information includes at least one of:
  a litigation history associated with the entity;
  information associated with infringement allegations asserted against the entity; or
  resolution information including at least one of settlement terms, damages, or information indicating whether the entity prevailed.

4. The system of claim 1, wherein the at least one term of the insurance policy includes at least one of:
a reimbursement provision covering a cost associated with defending against the claim of intellectual property infringement;
a settlement cost;
a damages cost;
legal costs; or
an indemnity cost.

5. The system of claim 1, the operations further comprising:
determining a first liability cost associated with the entity, wherein the first liability cost represents a first cost which the entity is responsible for in defense of an infringement allegation;
determining a second liability cost associated with an insurer, wherein the second liability cost represents a second cost which the insured is responsible for in the defense of the infringement allegation; and
wherein the at least one term includes the first liability cost and the second liability cost.

6. The system of claim 1, wherein receiving the information indicating the characteristic of the entity comprises:
causing display of a graphical entity interface to the entity, the graphical entity interface including an element configured to receive input data associated with the information; and
receiving the input data, the input data including at least the information.

7. The system of claim 1, wherein:
receiving the information indicating the characteristic of the entity comprises:
  accessing one or more databases having first data associated with the entity;
  identifying a given characteristic for which second data is unavailable in the one or more databases;
  sending, based at least in part on identifying the given characteristic, an intake document including an element requesting the second data; and
  receiving the second data; and
determining the characteristic data comprises determining the characteristic data based at least in part on the second data.

8. A method comprising:
receiving a request for an insurance quote to insure a entity against a claim of intellectual property infringement;
receiving information indicating a characteristic of the entity, the information including at least one of:
  business information;
  intellectual property information; or
  legal claim information;
generating, based at least in part on the information, characteristic data associated with the characteristic of the entity;
training a machine learning model configured to determine infringement exposure values associated with entities utilizing a training dataset including historical policy performance metrics such that a trained machine learning model is generated to weight characteristics of the entities;
determining, based at least in part on the characteristic data and utilizing the trained machine learning model, an infringement exposure value associated with the entity
receiving feedback data associated with the infringement exposure value;
determining, based at least in part on the infringement exposure value and the feedback data, a cost for insuring the entity against the claim of intellectual property infringement;
determining at least one term of an insurance policy associated with the entity, the insurance policy including at least the cost;
automatically generating policy data representing the insurance policy including the at least one term, the automatic generation of the policy data based at least in part on the characteristic data, the infringement exposure value, and the feedback data, and the automatic generation of the policy data performed absent user input and utilizing prior policy data generated in association with a prior insurance policy; and
sending the policy data to a device, the policy data causing the device to display the insurance policy along with functionality for accepting the insurance policy.

9. The method of claim 8, wherein determining the infringement exposure value comprises:
   causing display of a graphical entity interface to the entity, the graphical entity interface including an element configured to receive input data associated with at least one of the business information, the intellectual property information, or the legal claim information; and
   receiving the input data.

10. The method of claim 9, wherein:
   the business information includes at least an industry classification, a number of employees, or a revenue value;
   the intellectual property information includes at least one of:
      a number of intellectual property assets associated with the entity;
      a type of intellectual property of individual ones of the intellectual property assets;
      a licensing agreement associated with at least one of the intellectual property assets; or
      a second insurance policy associated with the at least one of the intellectual property assets; and
   the legal claim information includes at least one of:
      a litigation history associated with the entity;
      information associated with infringement allegations asserted against the entity; or
      resolution information, the resolution information including at least one of settlement terms, damages, or whether the entity prevailed.

11. The method of claim 8, further comprising:
   receiving, from at least one of a device associated with an insurer or at least one insurer, the feedback data associated with the infringement exposure value.

12. The method of claim 11, further comprising:
   receiving a first indication of acceptance of the insurance policy by the entity;
   receiving a second indication of acceptance of the insurance policy by the insurer; and
   in response to receiving the first indication and the second indication, issuing the insurance policy.

13. The method of claim 11, further comprising:
   determining a first liability cost associated with the entity, wherein the first liability cost represents a first cost which the entity is responsible for in defense of an infringement allegation;
   determining a second liability cost associated with the insurer, wherein the second liability cost represents a second cost which the insurer is responsible for in the defense of the infringement allegation; and
   wherein the insurance policy further includes the first liability cost and the second liability cost.

14. The method of claim 8, wherein the at least one term of the insurance policy includes at least one of:
   a reimbursement provision covering a cost associated with defending against the claim of intellectual property infringement;
   a settlement cost;
   a damages cost;
   legal cost; or
   an indemnity cost.

15. A system comprising:
   one or more processors; and
   non-transitory computer-readable media storing instructions that, when executed by the one or more processors, cause the one or more processors to perform operations comprising:
      receiving a request for an insurance quote to insure at least one entity against a claim of intellectual property infringement;
      receiving information indicating a characteristic of the at least one entity, the information including at least one of:
         business information;
         intellectual property information; or
         legal claim information;
      generating, based at least in part on the information, characteristic data associated with the characteristic of the at least one entity;
      training a machine learning model configured to determine infringement exposure values associated with entities utilizing a training dataset including historical policy performance metrics such that a trained machine learning model is generated to weight characteristics of the entities;
      analyzing characteristic data associated with one or more of the entities to determine one or more exposure values associated with individual entities of the one or more entities, the one or more exposure values associated with the claim of intellectual property infringement;
      identifying, based at least in part on the one or more exposure values, an entity of the one or more entities having an exposure value below an exposure value threshold;
      receiving feedback data associated with the exposure value;
      determining, based at least in part on the exposure value and the feedback data, a preliminary cost for insuring the entity;
      determining an insurance policy indication associated with the entity, the insurance policy indication including at least the preliminary cost for insuring the entity;
      automatically generating policy data representing the insurance policy indication including the preliminary cost, the automatic generation of the policy data based at least in part on the characteristic data, the exposure value, and the feedback data, and the automatic generation of the policy data performed absent user input and utilizing prior policy data generated in association with a prior insurance policy; and
      sending the policy data to a device, the policy data causing the device to display the insurance policy indication along with functionality for accepting the insurance policy indication.

16. The system of claim 15, wherein the insurance policy indication requests second information associated with the characteristic data.

17. The system of claim 16, the operations further comprising:
   receiving the input data associated with the information;
   analyzing the information to determine a final cost for insuring the entity; and
   determining at least one term of an insurance policy associated with the entity, the term of the insurance policy including at least the final cost.

18. The system of claim 17, wherein analyzing the information to determine the final cost for insuring the entity comprises:
   analyzing the information to determine additional characteristic data associated with the characteristic;

analyzing the characteristic data and the additional characteristic data to determine an additional exposure value associated with the entity; and determining, based at least in part on the additional exposure value, a final cost for insuring the entity.

19. The system of claim 18, the operations further comprising:

receiving, from at least one of a device associated with an insurer or the insurer, additional feedback data associated with the additional exposure value; and wherein determining the final cost for insuring the entity is further based at least in part on the additional feedback data.

\* \* \* \* \*